United States Patent
Hughes

(10) Patent No.: US 9,185,556 B2
(45) Date of Patent: Nov. 10, 2015

(54) METHOD AND SYSTEM FOR FORMING A COMMON NETWORK USING SHARED PRIVATE WIRELESS NETWORKS

(71) Applicant: Verizon Patent and Licensing Inc., Basking Ridge, NJ (US)

(72) Inventor: Kent W. Hughes, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 61 days.

(21) Appl. No.: 13/788,925

(22) Filed: Mar. 7, 2013

(65) Prior Publication Data

US 2014/0254548 A1    Sep. 11, 2014

(51) Int. Cl.
| | | |
|---|---|---|
| *H04W 4/00* | (2009.01) | |
| *H04W 12/06* | (2009.01) | |
| *H04W 8/18* | (2009.01) | |
| *H04W 36/14* | (2009.01) | |
| *H04W 48/18* | (2009.01) | |
| *H04W 84/04* | (2009.01) | |
| *H04W 24/04* | (2009.01) | |

(52) U.S. Cl.
CPC .............. *H04W 12/06* (2013.01); *H04W 8/186* (2013.01); *H04W 24/04* (2013.01); *H04W 36/14* (2013.01); *H04W 48/18* (2013.01); *H04W 84/045* (2013.01)

(58) Field of Classification Search
CPC ....... H04W 12/06; H04W 48/02; H04W 4/00; H04W 72/06; H04L 47/10; H04L 41/0896; H04L 67/02; H04L 67/306; H04L 67/16
USPC .................................. 370/331, 338, 254, 468
See application file for complete search history.

(56) References Cited

U.S. PATENT DOCUMENTS

| | | | | |
|---|---|---|---|---|
| 7,324,551 | B1* | 1/2008 | Stammers | 370/468 |
| 7,356,015 | B2* | 4/2008 | Ibe et al. | 370/338 |
| 7,483,984 | B1* | 1/2009 | Jonker et al. | 709/226 |
| 7,924,793 | B2* | 4/2011 | Savoor et al. | 370/338 |
| 2008/0005295 | A1* | 1/2008 | Burroughs et al. | 709/223 |
| 2011/0310865 | A1* | 12/2011 | Kennedy et al. | 370/338 |
| 2013/0138693 | A1* | 5/2013 | Sathish et al. | 707/784 |
| 2013/0318572 | A1* | 11/2013 | Singh et al. | 726/4 |
| 2014/0149562 | A1* | 5/2014 | Xiao et al. | 709/222 |

* cited by examiner

*Primary Examiner* — Edan Orgad
*Assistant Examiner* — Vanneilian Lalchinthang

(57) ABSTRACT

An approach for forming a common network using shared private wireless networks is described. A shared access platform receives a request, from a user device, for connectivity to a wireless service provider network formed by a plurality of customer premise nodes. The shared access platform also authenticates, in response to the request, the user device for access to the wireless service provider network based on permission settings established for the plurality of nodes in association with the wireless service provider network.

20 Claims, 12 Drawing Sheets

100

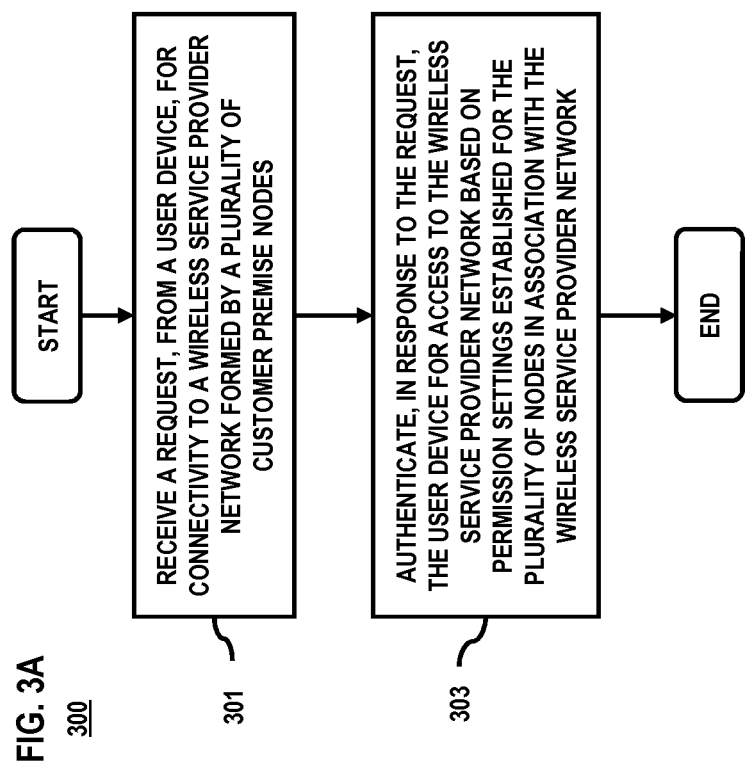

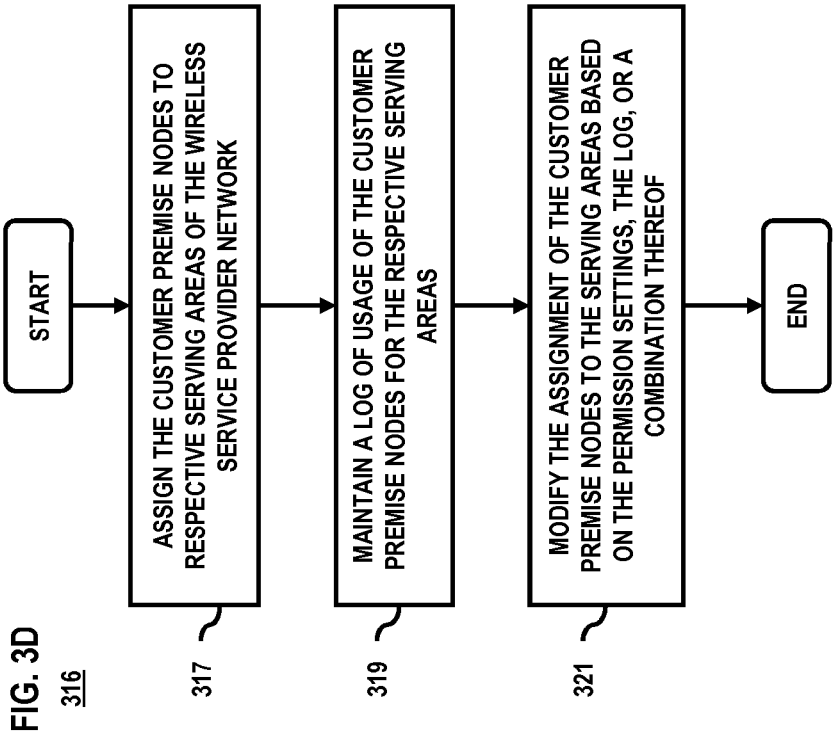

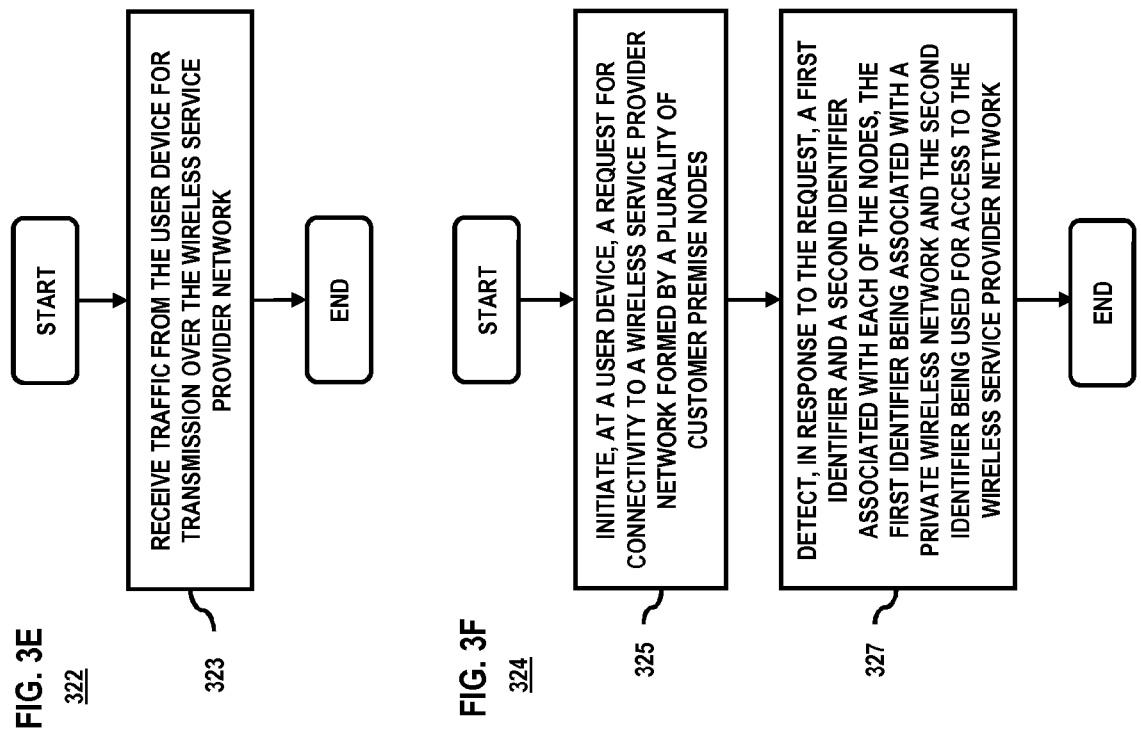

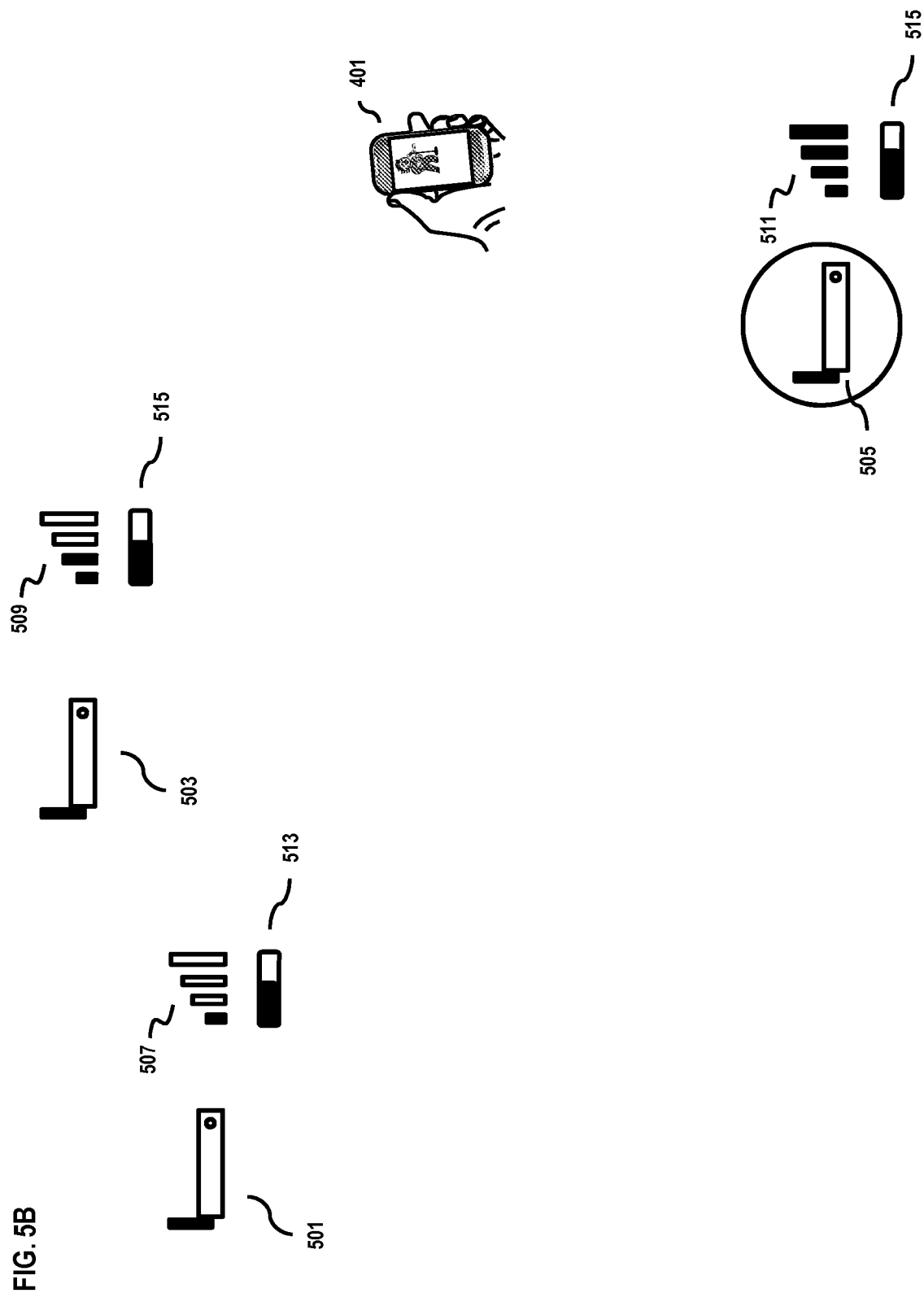

METHOD AND SYSTEM FOR FORMING A COMMON NETWORK USING SHARED PRIVATE WIRELESS NETWORKS

BACKGROUND INFORMATION

Service providers are continually challenged to deliver value and convenience to consumers by providing compelling network systems and services. One area of particular interest involves management of network resources, namely bandwidth, to ensure high network performance and availability even for the consumer level market (as opposed to enterprise customers). Consumers have adapted to the availability of broadband services by deploying high-speed private networks to access a multitude of sophisticated services, thereby placing greater strain on resources of the network service providers. With the increasing use of the network resources by user devices to access games, movies and other data intensive applications, bandwidth management can become problematic in bandwidth constrained environments. These user devices, such as smartphones or tablets, are generally able to connect to a cellular network as well as a wireless network (e.g., WiFi), and thus, can consume resources of either networks. However, little attention has been focused on managing such usage from the perspective of the service provider, as the interests of the end users and the service providers are generally in opposition.

Based on the foregoing, there is a need for better utilization of network resources, while enhancing coordination of resources of the end users' network and the network of the service provider.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3G are flowcharts of processes for forming a common network using shared private wireless networks, according to one embodiment, according to various embodiments;

FIGS. 5A and 5B are diagrams depicting a handoff procedure of the shared access platform, according to various embodiments;

DESCRIPTION OF THE PREFERRED EMBODIMENT

An apparatus, method and software for forming a common network using shared private wireless networks is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to WiFi technology, it is contemplated these embodiments have applicability to equivalent technology (e.g., Bluetooth, etc.).

Figure 1A:
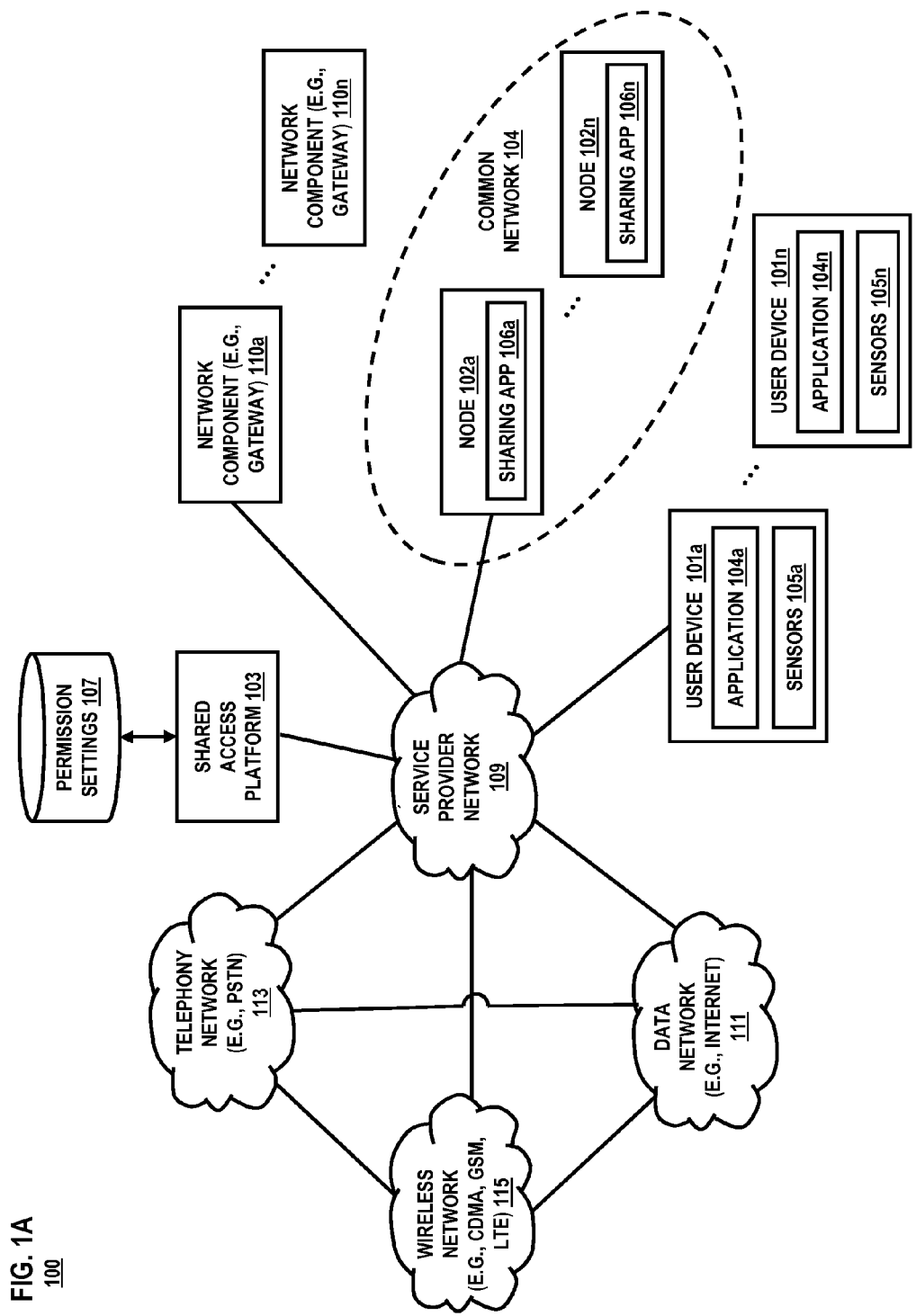
FIGS. 1A and 1B are diagrams of a system for forming a common network using shared private wireless networks, according to one embodiment.
Figure 1B:
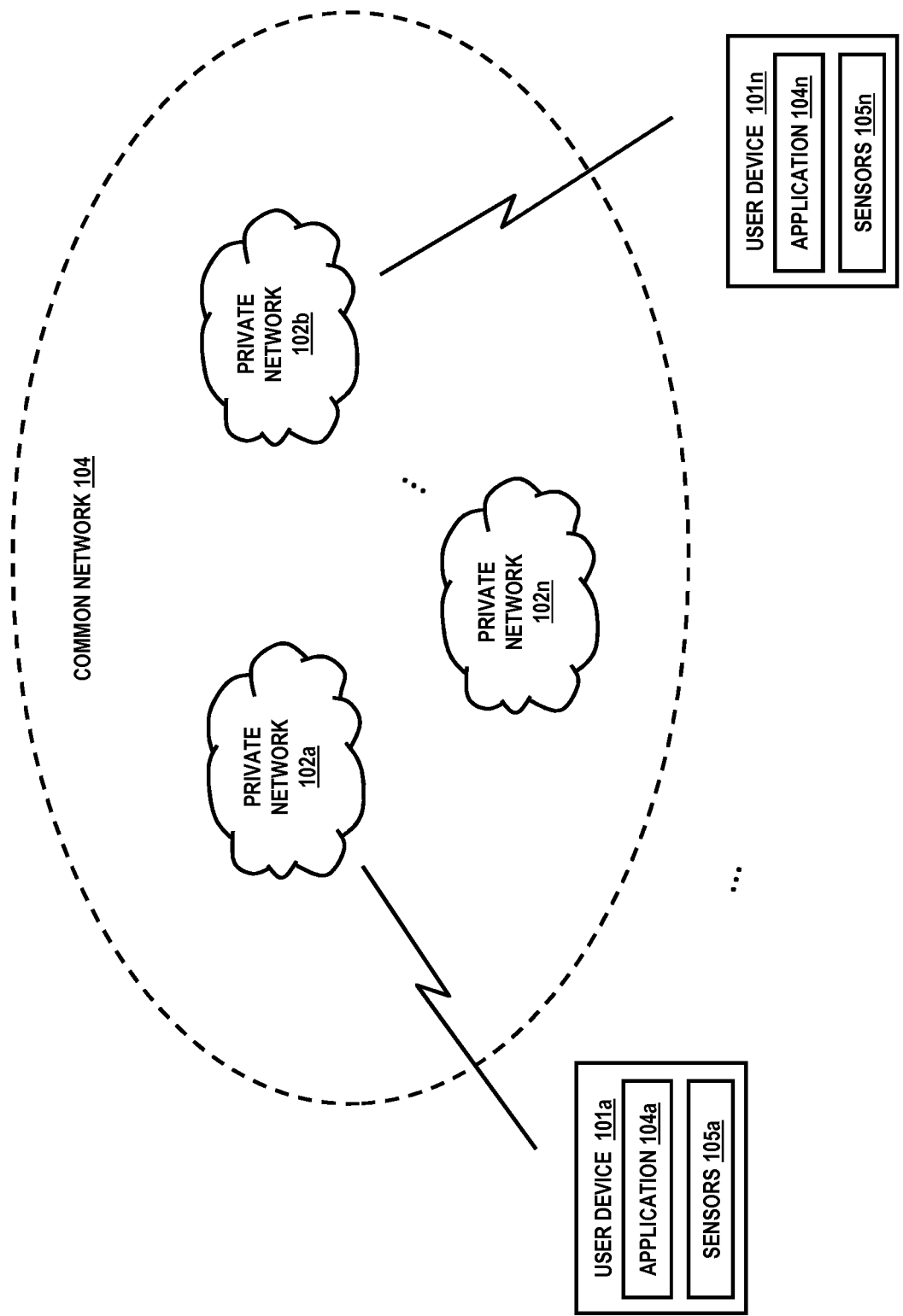

FIGS. 1A and 1B are diagrams of a system for forming a common network using shared private wireless networks, according to one embodiment. For the purposes of illustration, system 100 utilizes a shared access platform 103 to provide a wireless overlay network ("common network") comprising multiple wireless private networks (e.g., local area networks (LANs)) of the end users. In effect, the wireless access points (e.g., nodes 102) of these networks utilize multiple identifiers to segregate the private LAN from the common network 104 (that is managed by the service provider). By way of example, any one of the user devices 101a-101n can access the common network 104 as it traverses the coverage areas formed by the private networks. As seen in FIG. 1B, for the purposes of explanation, private networks are labeled synonymously with the corresponding nodes 102 (e.g., access points). Conceptually, common network 104 becomes a part of service provider network 109; however, it is contemplated that different providers can manage the shared access platform 103 (thus, common network 104) and the service provider network 109.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. Also, for the purpose of illustration herein, customer premise nodes may include routers, gateways, servers, wireless access points or any other devices configured at a premise, such as an office or home, for providing network access to the user devices 101a-101n. As will be discussed further, the customer premise nodes (e.g., access points), or nodes 102a-102n, may be configured for enabling the sharing of bandwidth with a device 101a-101n subscribed to the network 109.

With the increasing use of the network resources by user devices to access games, movies and other data intensive applications, bandwidth management can become problematic in bandwidth constrained environments. Consequently, service providers are challenged to effectively manage the limited bandwidth capacity of their network 109. One way for the provider to meet demand is to charge customers more money for access to the network 109 or to impose bandwidth limits on requesting devices 101a-101n. However, while this approach may inhibit use of the network 109, at least temporarily, it does not solve the issue of constrained bandwidth capacity. Another option for the service provider is to expand the infrastructure of the network 109 in an effort to make more bandwidth available for use by user devices 101a-101n. This approach, however, can be time consuming and costly for the service provide. Unfortunately, there is currently no convenient means by which a service provider network may better utilize its network resources while enhancing coordination of resources of the end users' network.

To address this issue, system 100 presents a shared access platform 103 that enables multiple customer premise nodes 102a-102n to form a common network 104 for enabling user device 101a-101n network access. By way of example, the shared access platform 103 operates in connection with different customer premise nodes 102a-102n, referred to herein collectively as nodes 102, according to a shared access scheme (for formulating the common network 104). In addition, the shared access platform 103 enables the nodes 102 to be detected by respective user devices 101a-101n (referred to herein as user devices 101) per the common network 104. Under this scenario, an amount of bandwidth maintained by the customer premise nodes 102 (or private networks thereof) is made available for use by a requesting user device 101a-101n that is subscribed to the service provider network 109. The shared access scheme for formulating the common network 104 may include data exchange between the nodes 102 and the shared access platform 103 for indicating permission to form the common network 104, the amount of bandwidth to be made available, bandwidth access settings such as schedule information and the like.

As noted in FIG. 1B, the private network 102 may be assigned a private internet protocol (IP) address space, per a known Internet addressing architecture, for supporting wireless (e.g., Wi-Fi) or wired communication. As such, any user devices 101 having the appropriate credentials and/or permissions to the private network 102 may access the assigned address space and bandwidth of the network; i.e., for supporting wireless networking tasks using Wi-Fi or other related wireless communication protocols. In certain embodiments, the shared access platform 103 enables the private network (or node 102) to be utilized by user devices 101 having access to the common network 104 (e.g., those user devices 101 subscribed with the provider of the network 109). Hence, even devices unrelated to the private network 102 and resources thereof, may perform network related tasks (e.g., access the Internet) via the common network configuration seamlessly. From the perspective of the user, the user device 101 may utilize the bandwidth of the common network 104—i.e., the aggregation of shared bandwidth of private networks 102—as if the bandwidth was directly from the service provider network 109.

In certain embodiments, the shared access scheme for enabling formation of the common network 104 may be established between the nodes 102 and the service provider network based on an incentive model. For example, the user of the nodes 102 (private networks) may be a subscriber to the service provider network 109, wherein various devices 101 of the user are configured to access the network 109. Under this scenario, the user may be offered service or customer related incentives (e.g., discounts, credits, special offers) in exchange for agreeing to participate in the common network 104. As another example, the user may be a non-subscriber to the service provider network 109 that is registered only with the shared access platform 103 for receiving various incentives. In either case, the shared access platform 103 may enable facilitation of the common network 104 among respective nodes 102 carry based on the generation and/or processing of permission settings. Of note, the shared access platform 103 may be accessed as a hosted solution or as a module for direct execution with the nodes 102 and user devices 101.

In certain embodiments, the shared access platform 103 maintains permission settings 107 for specifying acknowledgement of the agreement between the nodes 102 and the provider of the network 109 to enable bandwidth sharing (e.g., via the common network 104). By way of example, the sharing of bandwidth includes enabling, upon request, IP address space associated with or maintained by said nodes 102 to be utilized by the requesting device 101 as a resource of the service provider. In this way, the user device 101 that initiates the request accesses the bandwidth associated with the private network as if it were that of the service provider network 109. In addition, the permission settings 107 may indicate an amount of bandwidth to be shared/accessed by the user devices 101 via access to the common network 104. For example, the setting may be established by the user of the nodes 102 or prearranged as a fixed percentage. Still further, the permission settings may also specify a schedule in which user devices 101 are permitted to access bandwidth via nodes 102. As such, the settings may specify dates and/or times in which the nodes are restricted and/or permitted for access.

It is noted that the scheduling may be executed in conjunction with the amount of bandwidth to be shared for enabling customized distribution and regulation of the bandwidth of the private network by respective nodes 102. As such, the common network 104 may be formulated with respect to nodes 102 without monopolizing the entire bandwidth capacity of the nodes. Rather, the common network 104 serves as a wireless overlay through which the service provider network 109 is accessed by subscribed user devices 101.

Still further, the permission settings may also specify the generation and sharing of usage reports. In certain embodiments, the usage reports may include data and statistics for indicating usage of respective nodes 102 within the common network 104. Alternatively, the usage reports may include data for indicating the usage or accessing of one or more nodes of the common network by respective user devices 101. The usage reports may be reported to the user of nodes 102, user devices 101 as well as provided periodically to the service provider network 109 for analysis. By way of example, the service provider may determine the popularity or lack thereof of a given area or node 102 configured to the shared access platform 103. Based on this information, the service provider may make current or future network access decisions or adapt an incentive model associated with the user of said nodes 102. As another example, the user of a device 101 may determine the most or least popular areas/nodes they connect to as a basis for future connectivity needs.

It is noted the permission settings may be established by a user of the nodes 102 through execution of an application 104a-104n (referred to herein collectively as application 104) of user devices 101a-101n. By way of example, the application 104 may render a user interface at the device 101 for enabling user registration with the shared access platform 103. Per the interface, a user of the customer premise nodes 102 may enter the permission settings via one or more data fields, user selection fields, action buttons or the like. This may include initiating the permission settings for the first time or initiating execution of prior established permission settings. In addition, the application 104 may also feature instructions for enabling node 102 detection as well as for facilitating pass through authentication for the detected nodes 102. For the purpose of illustration, the nodes 102, which are configured to the shared access platform 103 per the shared access scheme, are referred to herein as participating nodes 102.

In addition, during an initial registration with the platform 103, the user may further request a downloading or installing of a sharing application 106a-106n (referred to herein collectively as sharing applications 106) at the nodes 102. The sharing application 106 may be implemented as a module for implementing a firewall between respective private networks and the service provider network 109. By way of this approach, the sharing application 106 ensures traffic associated with the different networks is segregated. As such, the nodes 102 within the common network 104 are prevented from unwarranted access by user devices 101 outside of the address space allocated for execution of the common network 104.

In addition, the sharing application 106 enables the node 102 to broadcast two different service set identifiers (SSIDs) for indicating the presence of the private network (node 102) and the service provider network 109. As such, broadcasting of the service set identifiers enables the respective networks to be detected by user devices 101. One SSID may indicate the private network while the other is detected as a wireless access point and/or hotspot for the provider of the network 109, i.e., the common network 104. In this case, detection of the SSIDs may occur when the requesting user device 101 is within range of the node, i.e., as configured within a premise. The shared access platform 103 may also maintain a list of the various private networks and/or nodes 102 for a given geographic region or area. This list may be referenced against location information gathered by sensors 105a-105n of respective devices 101a-101 for identifying nodes 102 and associated private networks that are configured to formulate a common network 104.

In certain embodiments, when the shared access platform 103 receives a request from a user device 101 for connectivity to the common network 104, the shared access platform 103 performs an authentication procedure. The request may be passed to the platform 103 via a network component 110a-110n of the service provider network 109, such as a network access gateway. Per the authentication procedure, the platform 103 determines whether the user device 101 has the appropriate permissions and credentials for accessing the network 109. This may include retrieving a subscriber profile for the device 101 as maintained by the service provider. In addition, the authentication may include processing location information for the user device 101 or signal strength information related to connectivity of the user device with a node 102 to determine whether any participating nodes 102 are available for access in response to a request. It is noted that the signal strength, location information and other contextual data may be detected by the user device 101 based on one or more sensors 105.

Still further, the shared access platform 103 determines whether the permission settings 107 for the node 102 are suitable for permitting common network 104 access. For example, in the case where the request is received at 8 am, the shared access platform 103 checks the permission settings 107 for corresponding schedule information related to the node 102 to determine if bandwidth is available at the time of request. It is noted the above described authentication steps may be performed seamlessly without the need for user intervention. Rather, once the device 101 is authenticated, the device 101 accesses the service provider network 109 via the common network 104.

In another embodiment, the shared access platform 103 operates in connection with the user device 101 and nodes 102 to manage the user device 101 handoff process. The handoff process pertains to the redirecting of a point of connection to the network 109. Hence, in this scenario, the shared access platform 103 ensures a device 101 connection to the common network 104 as established via a first node 102a is seamlessly redirected to a second node 102n in response to a change in location and/or proximity of the user device 101. In addition, the handoff may be initiated by the shared access platform 103 in response to a determined change in signal strength with respect to a given node 102. It is noted that the signal strength is based, at least in part, on the proximity of the user device 101 to the nodes 102, interference factors, etc.

By way of example, the shared access platform 103 periodically receives a report for indicating its relative signal strength with respect to a current participating node 102. The report may be generated by the application 104 of the user device 101 as it communicates with and/or detects a node 102. When the received signal strength is determined to meet a predetermined signal level threshold, the shared access platform 103 initiates a redirecting of the user device 101 to another participating node 102 having a higher signal strength. For example, in response to the report that participating node 102a features weak signal strength, a connection with node 102b having a signal strength greater than the predetermined threshold may be formulated. It is noted during this handoff procedure that data can be buffered by the network component 110 (e.g., a network access gateway) or by the user device 101 until the handoff procedure is complete.

In certain embodiments, the signal strength of nodes 102 relative to a requesting user device 101 may also be analyzed by the shared access platform 103 for enabling selection of a node to initially connect. The selection of a node 102 may be based, for example, on signal strength. As such, when a device 101 is determined to be in a certain service area of the network 109, the signal strength may be utilized as a determining factor for selecting participating/available nodes 102 within the service area for establishing the common network 104.

Also, in certain embodiments, the bandwidth availability of the participating nodes 102 is reported to the shared access platform 103 on a periodic basis. By way of example, the sharing application 106 may be configured to generate the report for indicating current or excess bandwidth of different nodes 102. As such, the bandwidth availability may be periodically analyzed by the shared access platform 103 to determine a node 102 to connect a device 101 to. It is noted that the selection and node availability may also be based upon context information for the device 101, including timing information and location information.

As a result of the reporting, the shared access platform 103 is able to maintain current & historical bandwidth/capacity data for all of the participating customer premise nodes 102 within a given service area. In addition, the platform 103 has access to signal strength information. Hence, in the case of multiple nodes 102 being available to a requesting user device 101 for a given location, the shared access platform 103 may select and/or handoff a node 102 based upon one or more of the following criteria: current excess bandwidth availability; preference settings of a user of nodes 102; the history of excess bandwidth availability of nodes 102 within a given service area; a specific incentive arrangement between the service provider and the user of nodes 102 (e.g., an agreement that traffic use is not to exceed a certain amount of gigabytes per month).

In certain embodiments, the shared access platform 103 may develop capacity plans, usage predictions, usage models, metrics, etc., pertaining to the nodes 102 or user devices 101 for a given service area. The plans, models, etc., may be developed based on the reports generated along with information regarding permission settings of respective nodes 102 or access settings of the user devices 101. By way of this intelligible data, the service provider may make decisions about how to allocate network 109 resources or where and how to expand their infrastructure based on factors such as the bandwidth capacity afforded by participating nodes, the amount of nodes participating by area/region, peak and off-peak usage periods, etc.

It is noted the above described system 100 enables a service provider network 109 to leverage the often under-utilized bandwidth capacity of respective nodes 102. By accessing the common network 104 established by nodes 102 via the permission settings 107, the bandwidth of the private networks (e.g., user configured Wi-Fi networks) may be employed for use by devices 101 subscribed to the service provider network 109. In addition, bandwidth of can be contributed within the common network 104 in a secure manner, without jeopardizing the privacy or integrity of the private networks. It is noted that the shared access platform 103 may be implemented as a hosted solution for access via the network 109, as an integrated/modular solution of a user device 101 or node 102, or a combination thereof.

In certain embodiments, user devices 101a-101n, the shared access platform 103 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 109 may embody or include portions of a signaling system 7 (SS7) network, Internet protocol multimedia subsystem (IMS), or other suitable infrastructure to support control and signaling functions.

Figure 2:
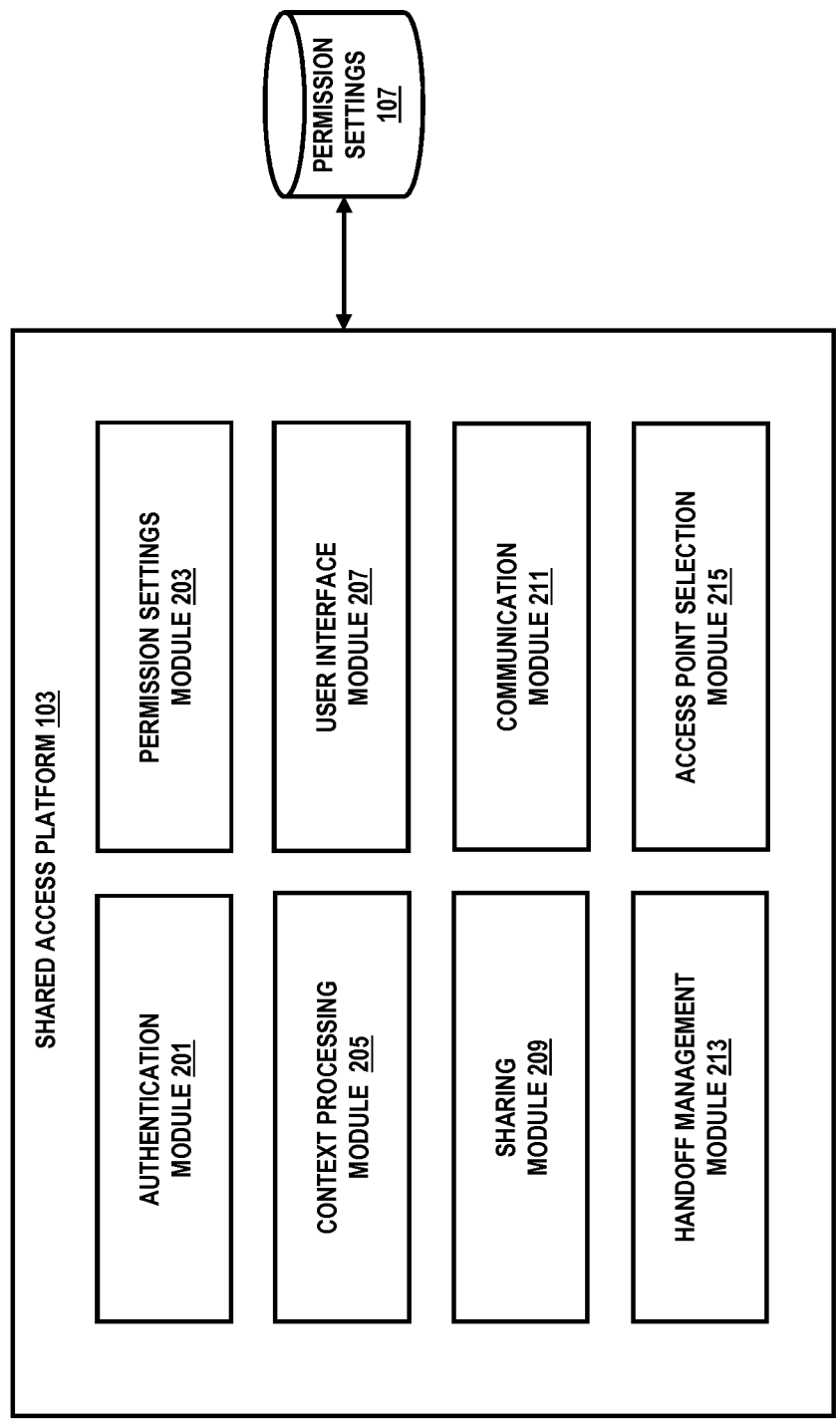
FIG. 2 is a diagram of a shared access platform, according to one embodiment.

FIG. 2 is a diagram of a shared access platform, according to one embodiment. The shared access platform 103 includes various executable modules for performing one or more computing, data processing and network based instructions that in combination provide a means for forming a common network using shared private wireless networks. Such modules can be implemented in hardware, firmware, software, or a combination thereof. By way of example, the shared access platform 103 may include an authentication module 201, a permission settings module 203, a context processing module 205, a user interface module 207, a sharing module 209, a communication module 211, a handoff management module 213 and a access point selection module 215. In addition, the shared access platform 103 also accesses permission settings data from a database 107.

In one embodiment, an authentication module 201 authenticates user devices 101 for interaction with the shared access platform 103. In addition, the authentication module 201 enables the registration of one or more nodes 102 for interaction with the platform 103, i.e., for enabling formulation of a common network 104 in association with the service provider network 109. By way of example, in the case of a user device 101, the authentication module 201 receives a request to access or acquire an application 104 for detecting one or more participating nodes 102. The application 104 may be downloaded per the registration procedure or otherwise activated for use at the user device 101. The authentication process may also include enabling the sharing of context information by the sensors 105 of the registered devices.

Still further, in the case of nodes that are to participate in the shared access scheme, the authentication module 201 facilitates the activating and/or loading of the sharing application 106. It is contemplated that the authentication module 201 may operate in connection with the sharing application 106 to facilitate configuration of the various participating nodes.

It is noted the registration procedure may be performed through automated association of profile information maintained by a provider of the network 109 with an IP address, a carrier detection signal of a user device, mobile directory number (MDN), subscriber identity module (SIM) (e.g., of a SIM card), radio frequency identifier (RFID) tag or other identifier. Under this scenario, the authentication module 203 may operate in connection with the communication module 211 to facilitate the retrieval of the profile information.

Still further, the authentication module 201 receives requests from devices 101 for establishing a network connection via the participating nodes 102. By way of example, the authentication module 201 passes the request to the permissions settings module 203 accordingly. In addition, the authentication module 201 may perform a validation of the application 104 at the device 101 to determine the user has the ability to interact with the participating nodes 102. Still further, the request may indicate (by device identifier) the particular nodes 102 to which the user is within range of or to which the request for connectivity to the common network 104 originates.

In one embodiment, the permission settings module 203 operates in connection with the user interface module 203 to permit the receipt and storing of permission settings related to a node 102. By way of example, the permissions settings module 203 causes the user interface module 207 to present user input options for specifying the bandwidth to be shared with requesting user devices. In addition, the module 203 causes settings for specifying the availability of nodes to be rendered to a display of a device. Once retrieved, the input is then stored to a permission settings record corresponding to the participating node. It is noted that the permissions settings 107 may be further associated with profile information of a subscribed user device (e.g., as maintained by the provider of the network 109) in instances where the nodes 102 and device 101 are related to the same user.

Still further, the permission settings module 203 also initiates retrieval of the permission settings for a node 102 corresponding to a request for access to the network 109. The retrieval may include performing a lookup within the database 107 for an identifier corresponding to the node 102, wherein the identifier is maintained for indicating an agreement for the node 102 to be used by user devices 101 for connecting with the service provider network 109. In addition, the permission settings module 203 may retrieve corresponding scheduling information associated with the node 102, an amount of bandwidth to be made available (e.g., expressed as a percentage), or a combination thereof. Once retrieved, the permission settings values are passed on to the sharing module 209, which initiates the connection request based on the permission settings accordingly. It is noted that the permissions settings enable the extent of and/or availability of respective nodes 102 for enabling a common network 104.

In certain embodiments, the sharing module 209 compares the permission settings values received from the permission settings module 203 against context information associated with the user device 101. The context information is determined based on a processing of context information captured by sensors 105 of device 101. By way of example, the context information may include temporal information, location information, or the like. Also, in certain implementations, the context processing module 205 may process signal strength information as conveyed by the nodes 102 and/or the user devices 101. By way of this approach, the sharing module 209 compares the temporal information against scheduling information to determine the availability of the corresponding node. When the node is available, the sharing module 209 then initiates a connection between the user device 101 and the corresponding node; thus facilitating access to the service provider network 109 via the common network 104.

In one embodiment the user interface module 207 enables presentment of a graphical user interface for enabling user registration with the shared access platform 103. In addition, the user interface module 207 enables rendering of a permission settings interface for receiving user input for specifying the settings of the accessing user device or a participating node. By way of example, the user interface module 215 generates the interface in response to application programming interfaces (APIs) or other function calls corresponding to the application 104 of the user devices 101 or sharing application 105 of the nodes 102; thus enabling the display of graphics primitives. It is noted that the user interface module 207 may support the configuration of a user device (e.g., a tablet device) for accessing a common network, a user device for participating within the common network (e.g., a wireless router device), or both.

In one embodiment, a communication module 211 enables formation of a session over a network 109 between the sharing access platform 103 and the application 104 of respective user devices 101. By way of example, the communication module 211 executes various protocols and data sharing techniques for enabling data exchange over the network 109. It is noted that the communication module 211 may also operate in connection with the context processing module 205 to support the retrieval of reports from the nodes 102, including reports for indicating bandwidth capacity or signal strength relative to a user device 101. The communication module 211 may be configured to retrieve the reports according to a specified period.

Also, in one embodiment, a handoff management module 213 is configured to manage a handoff procedure of respective nodes. By way of example, the handoff management module 213 ensures a device 101 connection to the network 109 as established via a first node is seamlessly redirected to a second node in response to a change in location and/or proximity of the user device 101. In addition, the handoff may be initiated in response to a determined change in signal strength (via the context processing module 205) for a given node 102, wherein the signal strength is determined based on the reports gathered by the communication module 211. As such, the handoff may be set to occur when a predetermined signal strength threshold is met—i.e., the module 213 initiates the handoff when the signal strength diminishes to a certain level.

In one embodiment, the access point selection module 215 is configured to determine a node 102 to select for enabling network access. As in the case of the handoff management module 213, the signal strength may be analyzed by the module 215. The module 215 then initiates a connection to the common network 104 via the node 102 that is determined to have the highest signal strength relative to the requesting user device 101. In addition, the access point selection module 215 may determine a selection based on permission settings associated with the nodes, such as scheduling information and other availability factors.

The above presented modules and components of the shared access platform 103 can be implemented in hardware, firmware, software, or a combination thereof. For example, though depicted as a separate entity in FIG. 1A, it is contemplated the shared access platform 103 may be implemented for direct operation by respective devices 101. As such, the shared access platform 103 may generate direct signal inputs by way of the operating system of the user device 101 for interacting with the application 104 and interfacing with a corresponding sharing application 106 of nodes 102. In another embodiment, one or more of the modules 201-215 may be implemented for operation by respective devices 101 as a hosted solution.

Figure 7:
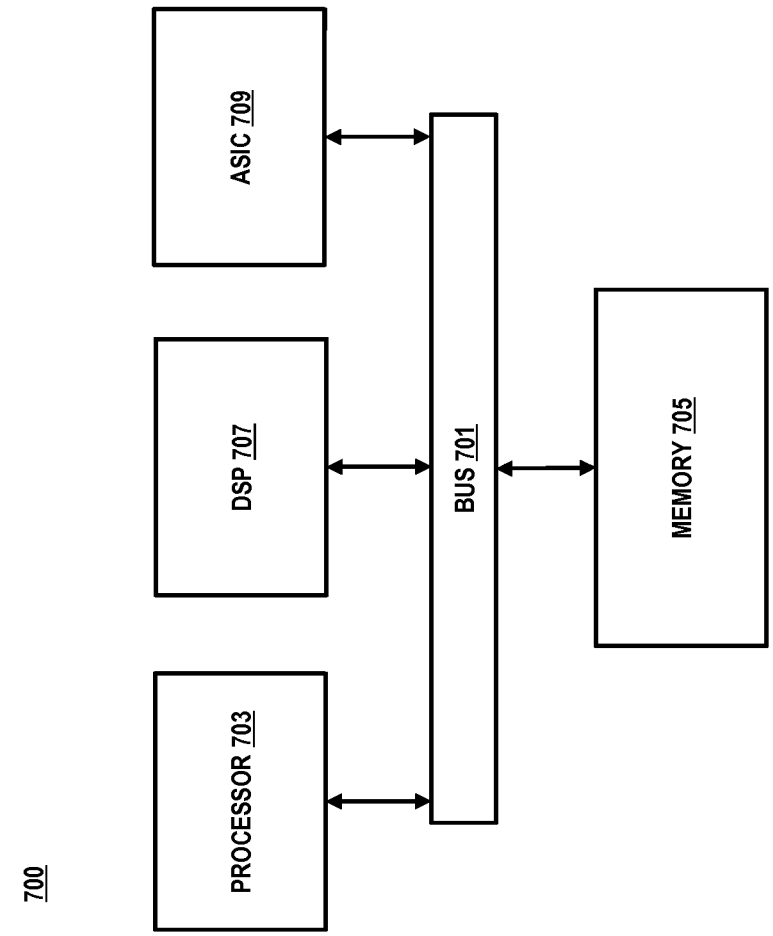
FIG. 7 is a diagram of a chip set that can be used to implement an embodiment of the invention.

FIG. 3A-3G are flowcharts of processes for forming a common network using shared private wireless networks, according to one embodiment, according to various embodiments. In one embodiment, the shared access platform 103 performs processes 300, 304, 308, 316, 322, 324 and 328 and is implemented in, for instance, a chip set including a processor and a memory as shown in FIG. 7.

In step 301, the shared access platform 103 receives a request, from a user device, for connectivity to a wireless service provider network formed by a plurality of customer premise nodes 102. As noted previously, the customer premise nodes may include network devices such as routers, servers or gateways configured within a customer premise such as a home or office. In another step 303, the platform 103 authenticates, in response to the request, the user device 101 for access to the wireless service provider network based on permission settings established for the plurality of nodes in association with the wireless service provider network. It is noted that each of the nodes is associated with a first identifier and a second identifier, wherein the first identifier is associated with a private wireless network associated with the nodes 102. The second identifier is used for access to the wireless service provider network. The second identifier, for example, may correspond to the common network 104, which serves as a wireless overlay network or extension of the service provider network 109.

In step 305 of process 304 (FIG. 3B), the shared access platform 103 receives a subscription request to join the wireless service provider network. As noted, the subscription request may be received by the platform 103 in response to user device 101 detection of a participating node 102 of the common network 104. In another step 307, the platform 103 adds a new customer premise node 102 to the wireless service provider network in response to the subscription request. Hence, the node 102 may be enabled for access by requesting user devices 101 for establishment of a common network 104 configuration with other participating nodes 102. It is noted the subscription request includes permission settings 107 corresponding to the new customer premise node.

In step 309 of process 308 (FIG. 3C), the shared access platform 103 receives a message, from one of the customer premise nodes 102 or the user device 101, indicating bandwidth availability of the one customer premise node 102, signal strength relating to connectivity of the user device 101 with the one customer premise node 102, or a combination thereof. As mentioned previously, the signal strength may be based, at least in part, on the proximity of the user device 101 to the nodes 102, interference factors, etc. In step 311, the platform 103 determines, based on the received message, the bandwidth availability, signal strength, or a combination thereof satisfies a predetermined threshold. In another step 313, the platform 103 initiates a handoff procedure to permit another one of the customer premise nodes 102 to serve the user device 101 based on the determination. Still further, in step 315, the platform 103 buffers traffic associated with the user device 101 as part of the handoff procedure.

In step 317 of process 316 (FIG. 3D), the shared access platform 103 assigns the customer premise nodes 102 to respective serving areas of the wireless service provider network 109. It is noted that the serving areas may indicate, for example, the locations of known common networks 104 associated with the service provider network. In another step 319, the platform 103 maintains a log of usage of the customer premise nodes 102 for the respective serving areas. In yet another step 321, the platform 103 modifies the assignment of the customer premise nodes to the serving areas based on the permission settings, the log, or a combination thereof. As noted previously, the permission settings may include user preference information (e.g., node availability times or dates) or bandwidth availability information for the respective customer premise nodes.

In step 323 of process 322 (FIG. 3E), the shared access platform 103 receives traffic from the user device 101 for transmission over the wireless service provider network. By way of example, the traffic originates from one of the customer premise nodes. Per the security feature of the shared access platform 103, the one customer premise node 102 may be configured to segregate the traffic from other traffic associated with a corresponding private wireless network. It is noted the private wireless network and the service provider network 109 may be associated with a first service set identifier and second service set identifier respectively for enabling detection and delineation of the respective networks by user devices 101.

In step 325 of process 325 (FIG. 3F), the shared access platform 103 initiates at a user device 101, a request for connectivity to a wireless service provider network 109 formed by a plurality of customer premise nodes 102. Per step 327, the platform 103 detects, in response to the request, a first identifier and a second identifier associated with each of the nodes, the first identifier being associated with a private wireless network and the second identifier being used for access to the wireless service provider network. As noted previously, the user device is prohibited from access to the private wireless network. The separation of the networks is made possible by way of firewall settings established between the networks accordingly.

In step 329 of produces 328 (FIG. 3G), the user device generates a message for indicating signal strength relating to connectivity of the user device with one of the customer premise nodes. In another step 331, the user device then initiates connectivity with another one of the customer premise nodes based on the signal strength, i.e., low signal strength. As mentioned previously, the request is associated with a handoff procedure.

Figure 4A:
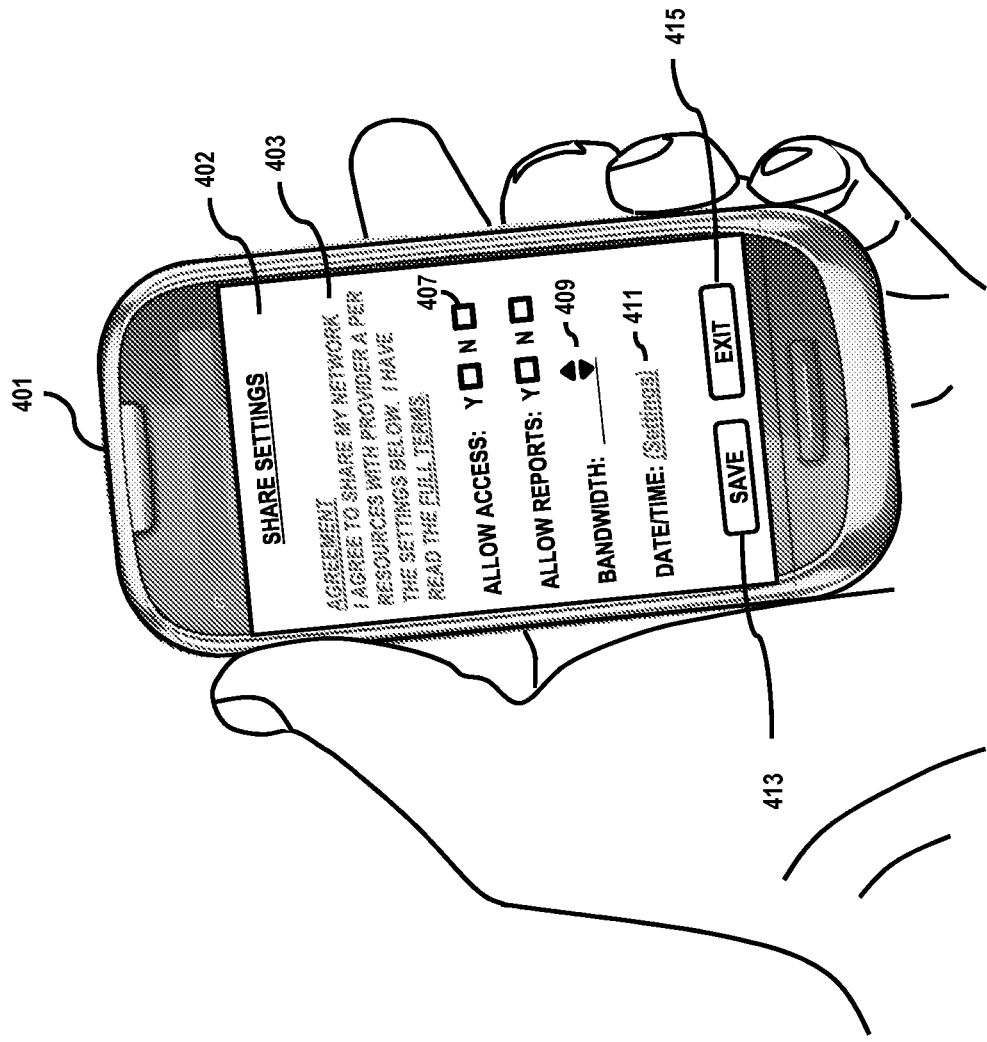
FIGS. 4A and 4B are diagrams of a user interface for enabling user interaction with the shared access platform, according to various embodiments.
Figure 4B:
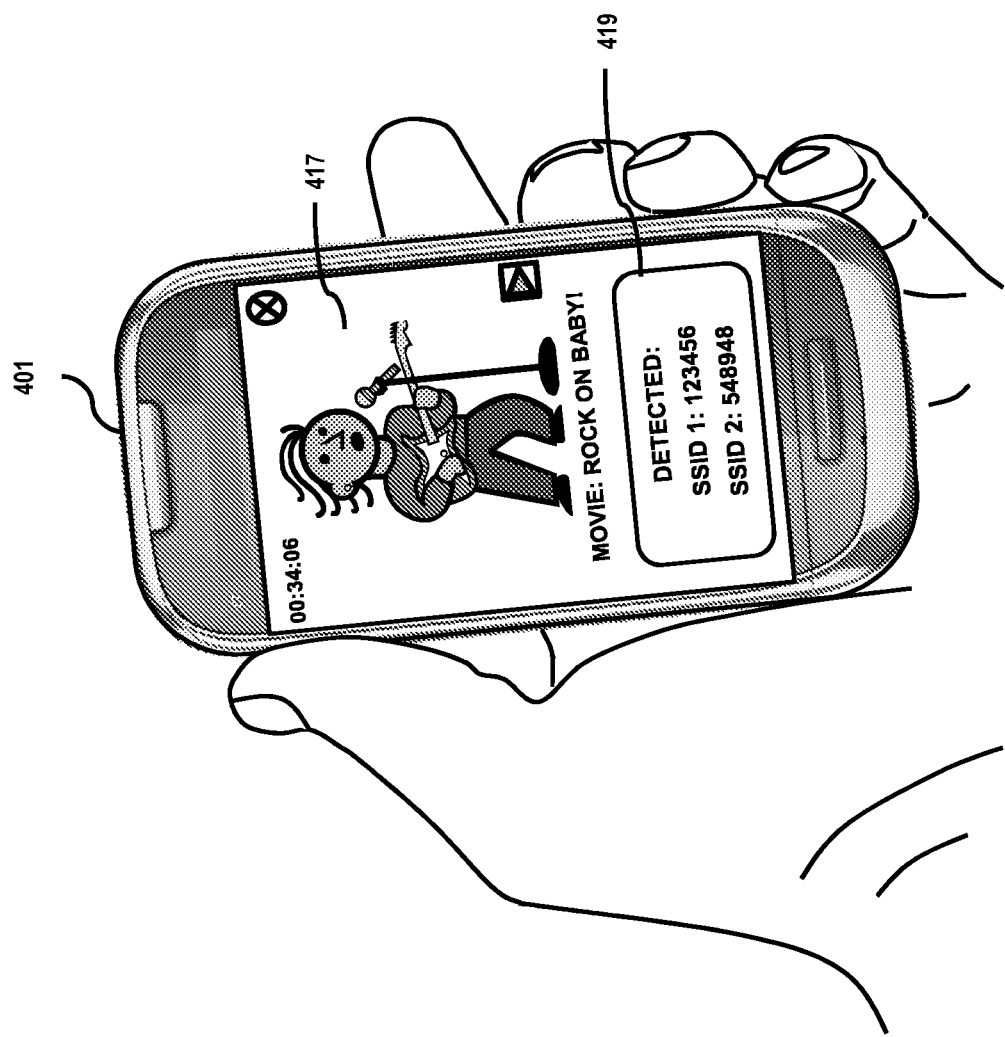

FIGS. 4A and 4B are diagrams of a user interface for enabling user interaction with the shared access platform, according to various embodiments. For the purpose of illustration, FIG. 4A is described with respect to an exemplary use case of a user that configures their private network (for interaction with the platform 103) via their mobile device 401. FIG. 4B is described with respect to the use case of a user device preconfigured to detect nodes that are part of a common network 104 via the shared access platform 103. It is noted, for example purposes, that the same or different devices of the user may be used for configuring the sharing scheme as well as for accessing one or more participating nodes of a common network 104 accordingly.

In FIG. 4A, the user activates a permission settings interface 402 of the shared access platform 103. The permission settings interface 402 features different selection options for configuring permissions—i.e., for affecting access to nodes 102 per the shared access scheme. Under this scenario, the nodes to be configured already have the sharing application 106 activated accordingly; thus the nodes are suited to enable a firewall protection mechanism as well as enable broadcasting of distinct network IP address information. By way of example, the user is presented with a caption 403 for indicating the terms of the sharing agreement. The caption may specify details regarding the sharing arrangement between the nodes associated with the user, the service provider network, specific incentives to be rendered, etc. The user may also be presented with a YES or NO checkboxes (e.g., checkbox 407) for indicating permission/agreement to the terms 402.

In addition, the user may be presented with a YES or NO checkbox for indicating permission/agreement to allow the sharing of reports with the shared access platform 103. The reporting may include the periodic sharing of bandwidth and signal strength information by the nodes that formulate the common network 104 and/or a requesting user device that accesses the network 104. Also, the user may specify an amount of bandwidth to be allowed for access by way of an increase/decrease selection button 409.

Still further, the user is presented with a settings link 411 for enabling the customization of schedule information relative to the nodes. While not shown expressly in the diagram, upon selection of the settings link 411a calendar may be rendered to the interface (e.g., per execution of a calendar widget). Per the calendar, the user may select specific days and/or time frames to permit and/or restrict access to the nodes associated with their private network. Once these settings are configured, the user may then select the SAVE action button 413 to save the settings and have them stored to the permission settings database 107. Alternatively, the user may select the EXIT action button 415 to exit from the interface 402.

In FIG. 4B, the mobile device 401 is configured with an application 104 for enabling it to detect nodes configured to the shared access platform 103. As such, when the user initiates a request for execution of movie content 417, the service set identifiers (SSIDs) corresponding to the participating node relative to the location of the device 401 and that of the service provider network are detected. For the purpose of illustration, two different SSIDs are shown via caption 419 for representing the private and service provider network respectively. It is noted, however, that the identifiers need not be presented to the user or via the interface. Rather, the connection with the service provider network 109 per the request may be carried out seamlessly, resulting in execution of the movie 417 based, at least in part, on bandwidth provided by the selected node. The selected node is therefore the means of user access to a common network, a wireless network through which the device 401 may access the service provider network.

Figure 5A:
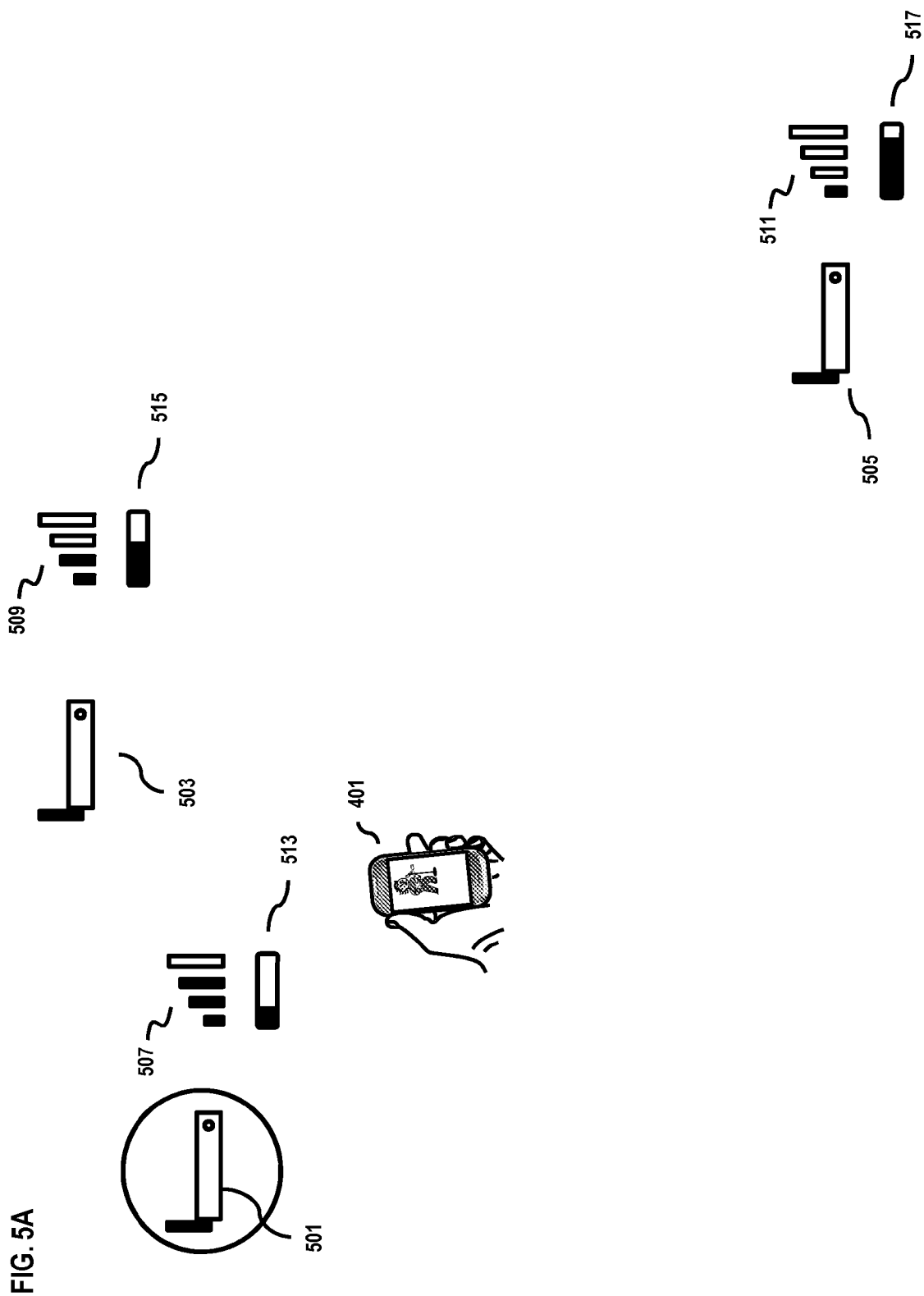

FIGS. 5A and 5B are diagrams depicting a handoff procedure of the shared access platform, according to various embodiments. For the purpose of illustration, the figures are described with respect to an exemplary use case of a user of a mobile device that is traveling through an area featuring different nodes configured for sharing.

In FIG. 5A, the shared access platform 103 interacts with a device 401 as the user travels about a given area. Under this scenario, the device 401 is within range of different wireless access points (WAPs) 501-505, or nodes, configured within different premises per a private network arrangement. For the purpose of illustration, the WAPs 501-505 also have permission settings, per the sharing software, established with the service provider network 109. It is noted the sharing software may be activated at the device per a subscription procedure and may include the exchange of device identifier information, network address information and other information with the shared access platform 103.

By way of example, the sharing platform 103 cross references permission settings of the nodes 501-505 corresponding to the service area to determine availability, access permissions and bandwidth sharing settings for the different WAPs. Once determined, the platform 103 further determines the relative signal strength of the different WAPs 501-505, with the signal strengths being depicted by signal strength indicators 507-511 respectively. In addition, the platform 103 determines the bandwidth availability of the different WAPs 501-505, as depicted by bandwidth indicators 513-517. As noted previously, the signal strength and bandwidth is based on reports generated by the nodes and/or the user device 401 relative to interaction with the nodes 501-505.

Under this scenario, the node featuring the best combination of availability factors is used for formulation of the network connection. Hence, this corresponds to node 501, which based on the current location of the device 401 and relative signal strength, the permission settings and bandwidth availability, represents the most reliable connectivity point. In FIG. 5B, however, a handoff procedure is executed in response to a change in selection factors, including a change in location of the device 401 and thus relative signal strength. Also, per this example, the bandwidth availability 513 of the original node 501 is shown to have diminished over time. Hence, given the relative signal strength, bandwidth availability and permission settings of nodes 501-505 for the serving area, the platform 103 is able to determine node 505 is best suited for formulating the connection. As such, the connection established with the network 109 via node 501 (e.g., of a common network) is formulated via node 505. It is noted that the periodicity of the reported signal strength and bandwidth availability may be adapted accordingly to accommodate different handoff scenarios.

It is contemplated, in future embodiments, that the shared access platform 103 may be configured to operate in connection with a route planning or navigation application. Under this scenario, route information and mapping information may be generated for indicating those service areas having the densest concentrations of available and/or participating nodes, highest bandwidth availabilities, etc. In addition, routes may be determined based on bandwidth availability factors or other criteria for supporting optimized access to the service provider network 109.

The processes described herein for forming a common network using shared private wireless networks may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
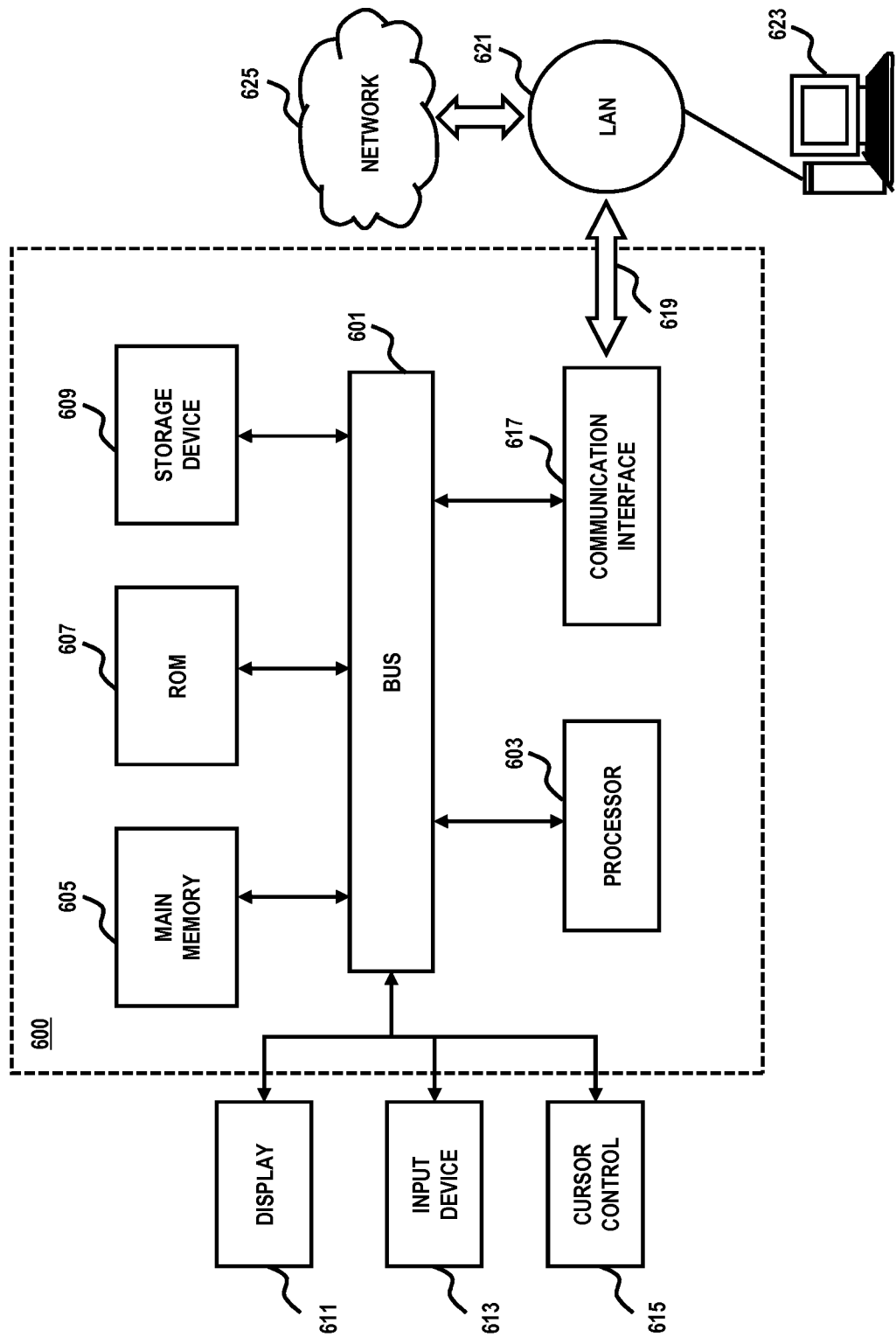
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc.

Although a single communication interface 617 is depicted in FIGS. 4A and 4B, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to enable a common network using shared private wireless networks as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of forming a common network using shared private wireless networks.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable a common network using shared private wireless networks. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving a request, from a user device, for connectivity to a wireless service provider network formed by a common network comprising a plurality of customer premise nodes, each customer premise node comprising a private wireless network, wherein an amount of bandwidth segregated from the private network is maintained by each of the customer premise nodes and wherein the amount of bandwidth segregated from among the plurality of customer premise nodes is aggregated to a total amount of segregated bandwidth made available for use by the user device that is subscribed to the service provider network;
authenticating, in response to the request, the user device for access to the wireless service provider network based on permission settings established for the plurality of customer premise nodes in association with the wireless service provider network, each of the customer premise nodes managing the subscription permissions at each of the respective customer premise nodes,
wherein each of the customer premise nodes is associated with a first identifier and a second identifier, the first identifier being associated with one of the private wireless network and the second identifier being used for access to the wireless service provider network; and
wherein the user device is prohibited from access to the private wireless network while being allowed to access the wireless service provider network.

2. The method according to claim 1, further comprising:
receiving a subscription request to join the wireless service provider network; and
adding a new customer premise node to the wireless service provider network in response to the subscription request, wherein the subscription request includes permission settings corresponding to the new customer premise node.

3. The method according to claim 1, further comprising:
receiving a message, from one of the customer premise nodes or the user device, indicating bandwidth availability of the one customer premise node, signal strength relating to connectivity of the user device with the one customer premise node, or a combination thereof;
determining, based on the received message, the bandwidth availability, signal strength, or a combination thereof satisfies a predetermined threshold; and
initiating a handoff procedure to permit another one of the customer premise nodes to serve the user device based on the determination.

4. The method according to claim 3, further comprising:
buffering traffic associated with the user device as part of the handoff procedure.

5. The method according to claim 1, further comprising:
assigning the customer premise nodes to respective serving areas of the wireless service provider network; and
maintaining a log of usage of the customer premise nodes for the respective serving areas, usage of the wireless service provider network by the user device, or a combination thereof.

6. The method according to claim 5, further comprising:
modifying the assignment of the customer premise nodes to the serving areas based on the permission settings, the log, or a combination thereof, wherein the permission settings include user preference information or bandwidth availability information for the respective customer premise nodes.

7. The method according to claim 1, wherein the first identifier and the second identifier provide service set identifiers are associated with the private wireless network and the wireless service provider network, respectively.

8. The method according to claim 1, further comprising:
receiving traffic from the user device for transmission over the wireless service provider network, wherein the traffic originates from one of the customer premise nodes, the one customer premise node being configured to segregate the traffic from other traffic associated with a corresponding private wireless network.

9. A method comprising:
initiating, at a user device, a request for connectivity to a wireless service provider network formed by a common network comprising a plurality of customer premise nodes, each customer premise node comprising a private network, wherein an amount of bandwidth segregated from the private network is maintained by each of the customer premise nodes and made available for use by the user device that is subscribed to the service provider network, the user device managing the subscription permissions at the user device; and
detecting, in response to the request, a first identifier and a second identifier associated with each of the nodes, the first identifier being associated with one of the private wireless networks and the second identifier being used for access to the wireless service provider network, wherein the user device is prohibited from access to the private wireless network while being allowed to access the wireless service provider network.

10. The method of claim 9, further comprising:
generating, at the user device, a message for indicating signal strength relating to connectivity of the user device with one of the customer premise nodes;
initiating connectivity with another one of the customer premise nodes based on the signal strength, wherein the request is associated with a handoff procedure.

11. An apparatus comprising:
at least one processor; and
at least one memory including computer program code for one or more programs, the at least one memory and the computer program code configured to, with the at least one processor, cause the apparatus to perform at least the following,
receive a request, from a user device, for connectivity to a wireless service provider network formed by a common network comprising a plurality of customer premise nodes, each customer premise node comprising a private wireless network, wherein an amount of bandwidth segregated from the private network is maintained by each of the customer premise nodes and wherein the amount of bandwidth segregated from among the plurality of customer premise nodes is aggregated to a total amount of segregated bandwidth made available for use by the user device that is subscribed to the service provider network;
authenticate, in response to the request, the user device for access to the wireless service provider network based on permission settings established for the plurality of customer nodes in association with the wireless service provider network, each of the customer premise nodes managing the subscription permissions at each of the respective customer premise nodes, wherein each of the customer premise nodes is associated with a first identifier and a second identifier, the first identifier being associated with the private wireless network and the second identifier being used for access to the wireless service provider network; and wherein the user device is prohibited from access to the private wireless network while being allowed to access the wireless service provider network.

12. An apparatus of claim 11, wherein the apparatus is further caused to:

receive a subscription request to join the wireless service provider network; and add a new customer premise node to the wireless service provider network in response to the subscription request, wherein the subscription request includes permission settings corresponding to the new customer premise node.

13. An apparatus of claim 11, wherein the apparatus is further caused to:

receive a message, from one of the customer premise nodes or the user device, indicating bandwidth availability of the one customer premise node, signal strength relating to connectivity of the user device with the one customer premise node, or a combination thereof;

determine, based on the received message, the bandwidth availability, signal strength, or a combination thereof satisfies a predetermined threshold; and initiate a handoff procedure to permit another one of the customer premise nodes to serve the user device based on the determination.

14. An apparatus of claim 13, wherein the apparatus is further caused to: buffer traffic associated with the user device as part of the handoff procedure.

15. An apparatus of claim 11, wherein the apparatus is further caused to:

assign the customer premise nodes to respective serving areas of the wireless service provider network; and maintain a log of usage of the customer premise nodes for the respective serving areas, usage of the wireless service provider network by the user device, or a combination thereof.

16. An apparatus of claim 15, wherein the apparatus is further caused to:

modify the assignment of the customer premise nodes to the serving areas based on the permission settings, the log, or a combination thereof, wherein the permission settings include user preference information or bandwidth availability information for the respective customer premise nodes.

17. An apparatus according to claim 11, wherein the first identifier and the second identifier provide service set identifiers are associated with the private wireless network and the wireless service provider network, respectively.

18. An apparatus of claim 11, wherein the apparatus is further caused to:

receive traffic from the user device for transmission over the wireless service provider network, wherein the traffic originates from one of the customer premise nodes, the one customer premise node being configured to segregate the traffic from other traffic associated with a corresponding private wireless network.

19. An apparatus of claim 11, wherein the apparatus is further caused to:

initiate, at a user device, a request for connectivity to a wireless service provider network formed by a plurality of customer premise nodes; and detect, in response to the request, a first identifier and a second identifier associated with each of the nodes, the first identifier being associated with a private wireless network and the second identifier being used for access to the wireless service provider network, wherein the user device is prohibited from access to the private wireless network.

20. An apparatus of claim 11, wherein the apparatus is further caused to:

generate, at the user device, a message for indicating signal strength relating to connectivity of the user device with one of the customer premise nodes;

initiate connectivity with another one of the customer premise nodes based on the signal strength, wherein the request is associated with a handoff procedure.

* * * * *